US008204893B2

(12) United States Patent
Kim et al.

(10) Patent No.: US 8,204,893 B2
(45) Date of Patent: Jun. 19, 2012

(54) APPARATUS FOR PROCESSING TIME-BASE DATA AND METHOD THEREOF

(75) Inventors: Jung Hun Kim, Busan Metropolitan (KR); Young Ho Rhee, Seoul (KR); Jae Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 540 days.

(21) Appl. No.: 12/115,234

(22) Filed: May 5, 2008

(65) Prior Publication Data

US 2008/0301165 A1 Dec. 4, 2008

(30) Foreign Application Priority Data

May 4, 2007 (KR) .................. 10-2007-0043601

(51) Int. Cl.
*G06F 17/30* (2006.01)
(52) U.S. Cl. ........ 707/753; 707/736; 707/748; 707/752; 707/754; 707/805
(58) Field of Classification Search .................. 707/754, 707/736, 748, 752, 753, 805
See application file for complete search history.

(56) References Cited

U.S. PATENT DOCUMENTS

| 5,920,866 | A | 7/1999 | Crim |
| 6,236,396 | B1 | 5/2001 | Jenson et al. |
| 7,107,548 | B2 | 9/2006 | Shafron |
| 2004/0104943 | A1* | 6/2004 | Kamasaki et al. ............ 345/773 |
| 2005/0008264 | A1* | 1/2005 | Iida et al. ...................... 382/305 |
| 2005/0192953 | A1 | 9/2005 | Neale et al. |
| 2006/0053161 | A1* | 3/2006 | Lee ............................. 707/104.1 |
| 2006/0053172 | A1* | 3/2006 | Gardner et al. ............... 707/203 |
| 2006/0112085 | A1* | 5/2006 | Zijlstra et al. ..................... 707/3 |
| 2006/0214887 | A1* | 9/2006 | Ishida et al. ..................... 345/63 |
| 2006/0224433 | A1* | 10/2006 | Baek et al. ......................... 705/9 |
| 2006/0280497 | A1* | 12/2006 | Wakabayashi ................ 396/287 |
| 2008/0222166 | A1* | 9/2008 | Hultgren et al. .............. 707/100 |

FOREIGN PATENT DOCUMENTS

| JP | 2006-072671 | 3/2006 |
| KR | 100620008 | 8/2006 |

OTHER PUBLICATIONS

Bott et al., Special Edition Using Windows 95 with Internet Explorer 4.0, Feb. 17, 1998, Que, pp. 9-10, 275-278, 303-306, ISBN 978-0-7897-1553-1.*

* cited by examiner

*Primary Examiner* — Frantz Coby
(74) *Attorney, Agent, or Firm* — The Farrell Law Firm, P.C.

(57) ABSTRACT

A data processing apparatus and a method for displaying time-based data are provided. The data processing apparatus includes a storage unit for storing data processed by the data processing apparatus and identification information for sorting the data, a display unit having a first display section for displaying one or more data sort functions and a second display section for displaying data according to a data sort function selected from the first display section, and a control unit for sorting the data stored in the storage unit and controlling the display unit to display the data in a life data mode.

15 Claims, 6 Drawing Sheets

19

APPARATUS FOR PROCESSING TIME-BASE DATA AND METHOD THEREOF

PRIORITY

This application claims priority under 35 U.S.C. §119(a) to an application entitled "APPARATUS FOR PROCESSING TIME-BASE DATA AND METHOD THEREOF" filed in the Korean Intellectual Property Office on May 4, 2007 and assigned Serial No. 2007-0043601, the contents of which are incorporated herein by reference.

BACKGROUND OF THE INVENTION

1. Field of the Invention

The present invention relates generally to a data processing apparatus, and more particularly, to a data processing apparatus for displaying various data according to their functions, and a method thereof.

2. Description of the Related Art

With recent developments in information and telecommunication technology, various data processing apparatuses, such as mobile phones, computers, notebook computers, MP3 players, and digital cameras, have become popular. A data processing apparatus is commonly used in daily life due to its advantages in generating and storing data, and thereby the variety and quantity of data stored in the data processing apparatus are increasing.

In the prior art, the data stored in the data processing apparatus is identified by selecting a data item from a menu. A function of viewing detailed information must be selected to identify a data generation date.

Although a user may easily search data by selecting a data item from a menu in the data processing apparatus, the user may experience inconvenience in searching data stored in the data processing apparatus. When the user desires to search data generated on a specific date, the user must identify all data generated on that date. The user may sort data included in a menu by type of data, data generation time point, and format of the data file. However, the user may still experience inconvenience in searching data stored in the data processing apparatus.

SUMMARY OF THE INVENTION

The present invention has been made to address at least the above problems and/or disadvantages and to provide at least the advantages described below. Accordingly, an aspect of the present invention provides a data processing apparatus for displaying data stored in the data processing apparatus, and a method thereof.

Another aspect of the present invention further provides a data processing apparatus for displaying data stored in the data processing apparatus by data generation dates, and a method thereof.

An additional aspect of the present invention further provides a data processing apparatus for displaying data stored in the data processing apparatus by data sort functions, and a method thereof.

According to one aspect of the present invention, a data processing apparatus is provided. The data processing apparatus includes a storage unit for storing data processed by the data processing apparatus and identification information for sorting the data. The data processing apparatus also includes a display unit having a first display section for displaying data sort functions and a second display section for displaying data according to a data sort function selected from the first display section. Finally, the data processing apparatus includes a control unit for sorting the data stored in the storage unit and controlling the display unit to display the data in a life data mode.

According to another aspect of the present invention, a method of displaying time-based data in a data processing apparatus is provided. Data stored in the data processing apparatus is sorted by dates in a life data mode. A first display section having data sort functions and a second display section having the data sorted by dates are displayed. The data according to a selected data sort function is displayed, when the data sort function is selected from the first display section.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention are described in detail with reference to the accompanying drawings. The same reference numbers are used throughout the drawings. Detailed descriptions of constructions or processes known in the art may be omitted to avoid obscuring the subject matters of the present invention.

In the following description of the present invention, "data processing apparatus" means an apparatus for generating, storing, and exchanging data, such as a computer, mobile terminal, or notebook computer. The data processing apparatus includes all kinds of apparatus capable of displaying stored data on a screen, such as a digital camera, MP3 player, or Portable Multimedia Player (PMP).

"Data" means all kinds of information stored in the data processing apparatus, such as data generated and stored during operation of the data processing apparatus and data downloaded from another data processing apparatus. For example, data generated by a mobile terminal may be photographic data, MP3 data, movie data, appointments and activities included in a personal scheduler, or transmitted and received call data and messages. The data generated by a mobile terminal may be used in a computer by transmitting the data to the computer. Further, the data stored in the data processing apparatus may be uploaded to a web page (for example, a blog) through an Internet connection.

"Information" means a detailed description that is shown when data is selected, and includes data generation time point, data size, and name assigned to data.

"Life data mode" is a mode in which data stored in the data processing apparatus is sorted by date of generation. The life data mode may be displayed in a waiting screen of the data processing apparatus or in a screen selected from a menu.

Further, the life data mode may be displayed as a part of a menu such as a diary function. The life data mode may be applied to all kinds of data processing apparatuses displaying data.

In the life data mode, data stored in the data processing apparatus are sorted and displayed by selecting a data sort function. The data sort function may be a search function for searching data by inputting a keyword, a filtering function for sorting the data by types of data, data generation time period, and menu items to which individual data are assigned, and a tag function for displaying data by using tags assigned to individual data.

"Keyword" is a word that is input to search specific data from data stored in the data processing apparatus, and may be a name of data, data file format, menu, or date.

"Icon" is an image assigned to each function of data stored in the data processing apparatus in a life data mode.

Figure 1:
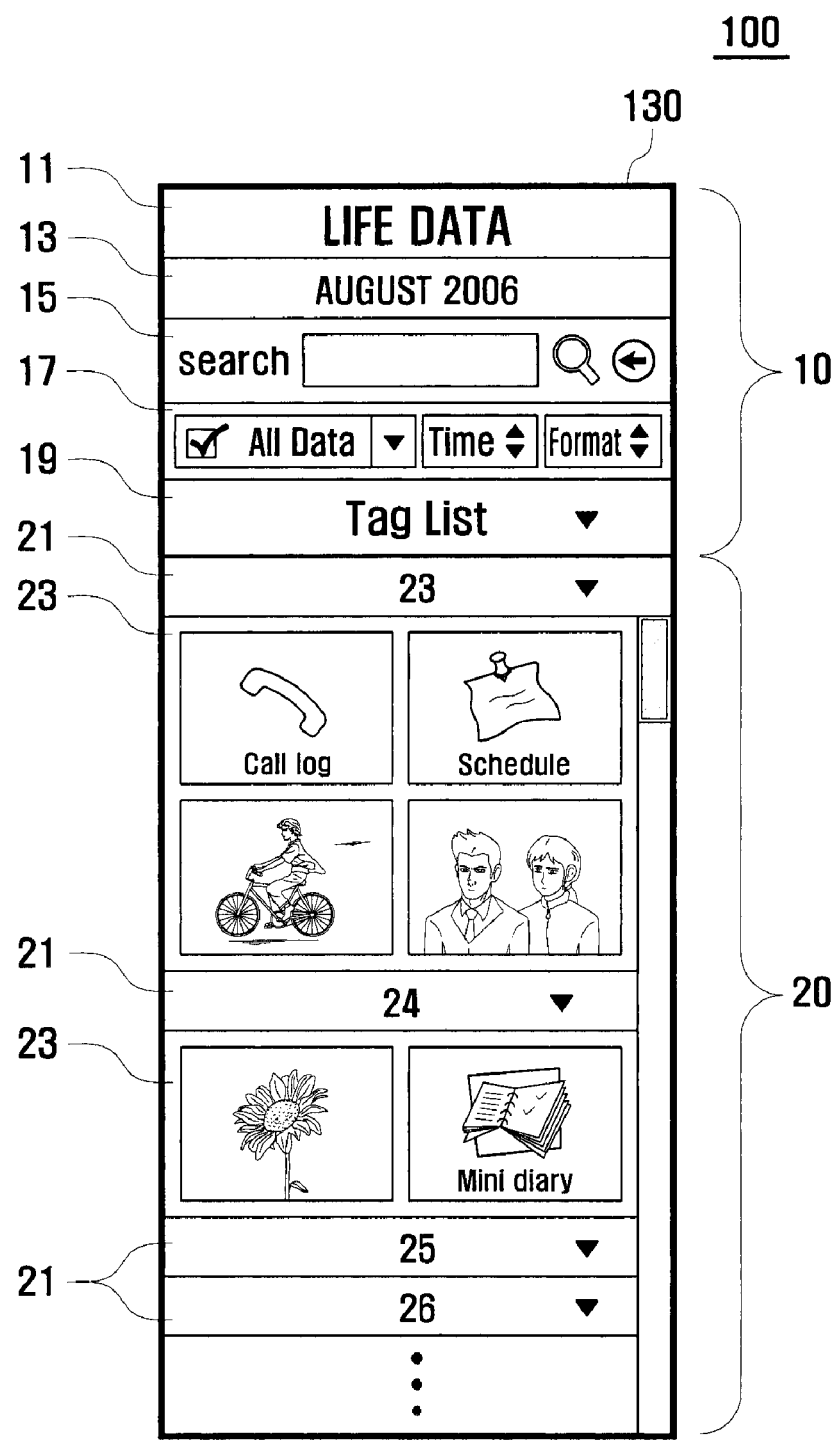
FIG. 1 is a screen display example showing data according to an embodiment of the present invention.

FIG. 1 is a screen display example showing data according to an embodiment of the present invention. FIGS. 2, 3, 4, and 5 are detailed views showing a first date display area, a search area, a filtering area, and a tag area respectively in a first display section of the screen display of FIG. 1.

Referring to FIG. 1, in a life data mode, all data stored in a data processing apparatus 100 are displayed in a display unit 130, wherein the stored data are sorted by data generation dates and subsequently by a selected data sort function.

A display screen of a life data mode includes a first display section 10 displaying data sort functions for sorting or searching data, and a second display section 20 displaying the sorted data. The first display section 10 includes a menu area 11, a first date display area 13, a search area 15, a filtering area 17, and a tag area 19.

Figure 2:
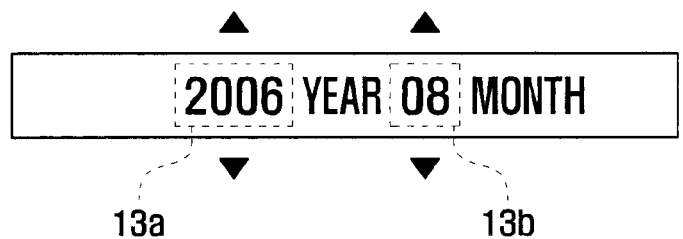
FIGS. 2, 3, 4, and 5 are detailed views showing a first date display area, search area, filtering area, and tag area respectively in a first display section of the screen display of FIG. 1.

The menu area 11 is an area in which a mode of the data processing apparatus 100 is displayed. The first date display area 13 displays a year 13a and a month 13b in which data stored in the data processing apparatus 100 is generated, as shown in FIG. 2. In the first date display area 13, the year 13a and month 13b may be selected by using arrow keys displayed at upper and lower positions of the first date display area 13. Data corresponding to the selected year 13a and month 13b are displayed in the second display section 20. For example, if the right upward arrow key of FIG. 2 is selected, the month 13b changes from '08' (i.e., August) to '09' (i.e., September). If the month 13b changes, the second display section 20 displays data of the corresponding month. The arrow keys may be located at upper and lower positions of the year 13a and month 13b, as shown in FIG. 2, or may be located at right and left sides of the year 13a and month 13b.

Figure 3:
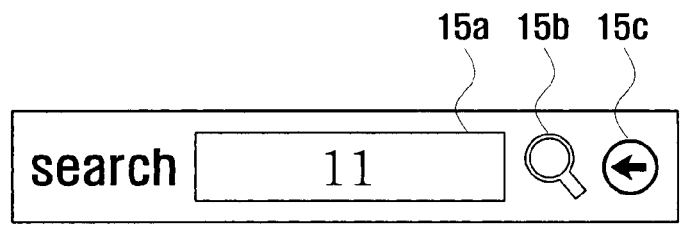

Referring to FIG. 3, the search area 15 includes an input window 15a for inputting a keyword, a search key 15b for starting a data search, and a cancel key 15c for canceling the search result and returning to the previous display status of the second display section 20. The keyword may be a name of data, a tag, or a character string included in the data. If a keyword is input in the input window 15a and the search key 15b is selected, data stored in the data processing apparatus 100 is searched and the results are displayed in the second display section 20.

Figure 4:
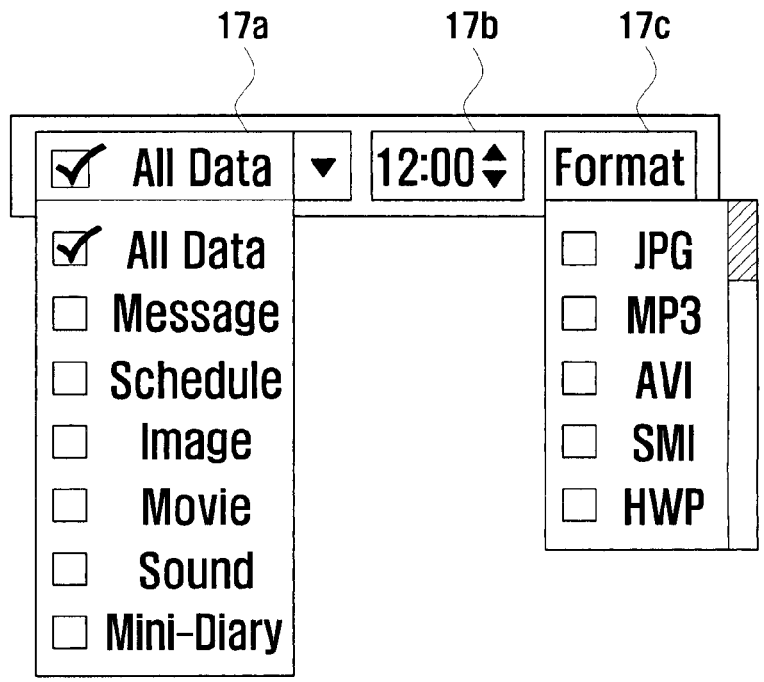

Referring to FIG. 4, the filtering area 17 includes a type filtering key 17a for sorting the data by data types, a time filtering key 17b for sorting the data by data generation time, and a format filtering key 17c for sorting the data by data file formats.

If the type filtering key 17a is selected, types of data stored in the data processing apparatus 100 are displayed as a list. If a specific data type is selected from the displayed list, data corresponding to the selected data type are displayed in the second display section 20. The data type may include a message, a schedule, an image, a movie, a sound, and a mini-diary. The data types being displayed when the filtering key 17a is selected may be set by a user, and all the menu items may be set to be displayed in the list. The filtering area 17 may further include a function key (not shown) for filtering the data stored in the data processing apparatus by data size.

By using the upward and downward arrow keys displayed at the right side of the time filtering key 17b, the data may be displayed in the display section 20 in order of data generation time point. Here, the data may be displayed in an ascending order or in a descending order of the data generation time.

The format filtering key 17c sorts the data by data file format. If the format filtering key 17c is selected, data file formats are displayed as a list and the data stored in the data processing apparatus is displayed in the second display section 20 in alphabetic order of data file format. Subsequently, if a data file format is selected from the display list, only the data corresponding to the selected data file format is displayed in the display section 20. The data format may include a picture file format (for example, jpg), music file format (for example, mp3, wav, or wma), video file format (for example, avi), and document file format (for example, doc, or hwp).

Figure 5:
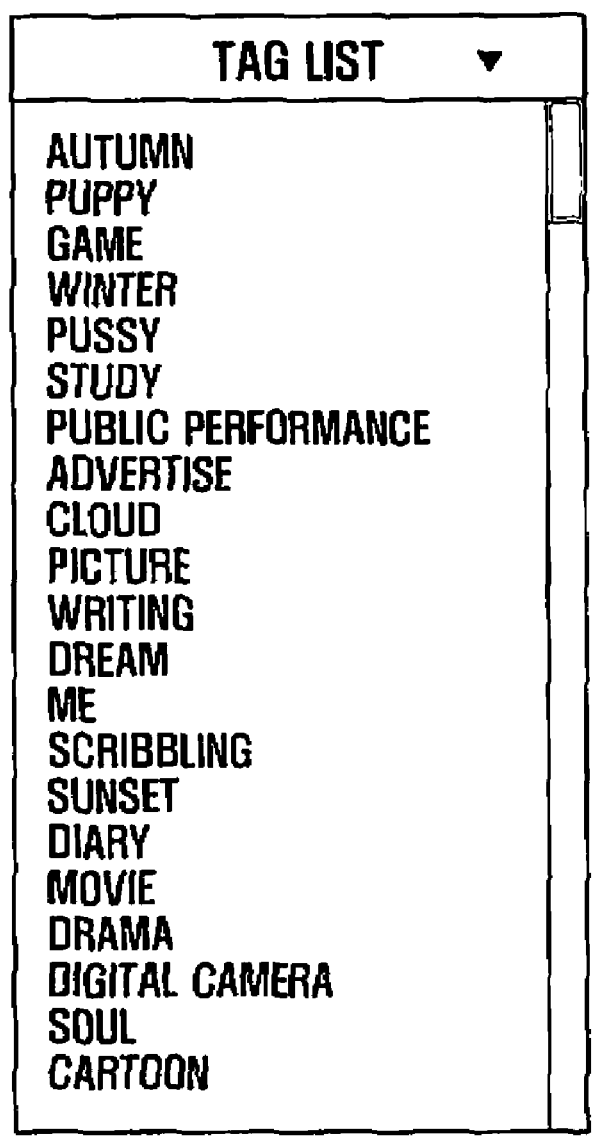

The tag area 19 displays a list of data tags, and displays data in the second display section 20 according to a tag selected from the displayed list by the user. The tag is a character or a symbol added for description of the data. If the tag area 19 is selected, a list of tags is displayed, including tags such as 'autumn', 'puppy', 'game', and 'winter', as shown in FIG. 5. If a specific tag is selected from the list, data corresponding to the selected tag are displayed in the display section 20.

The second display section 20 includes a second date display area 21 for displaying a data generation day and a data display area 23 for displaying data corresponding to the data generation date, as shown in FIG. 1. The second display section 20 may display data according to a function selected from the first display section 10 and the data may be displayed as icons or a list of data. For example, if a keyword is input in the input window 15a of the first display section 10, the second display section 20 displays icons of data corresponding to the keyword. If the second date display area 21 is moved to the last day of a month by using a scroll bar in the second display section 20, data of the following month or of the following year may further be displayed. If the second date display area 21 is moved to the first day of a month in the second display section 20, data of the previous month or of the previous year may further be displayed.

In the method of displaying data in the second display section 20 of the life data mode, the number of icons displayed may vary according to the size of the second display section 20. Although two icons are displayed in each row of the second display section 20 of FIG. 1, more or fewer icons may be displayed according to the size of the second display section 20. If an icon is selected from the icons displayed in the second display section 20, detailed information or data corresponding to the selected icon is displayed in a pop-up window.

Figure 6:
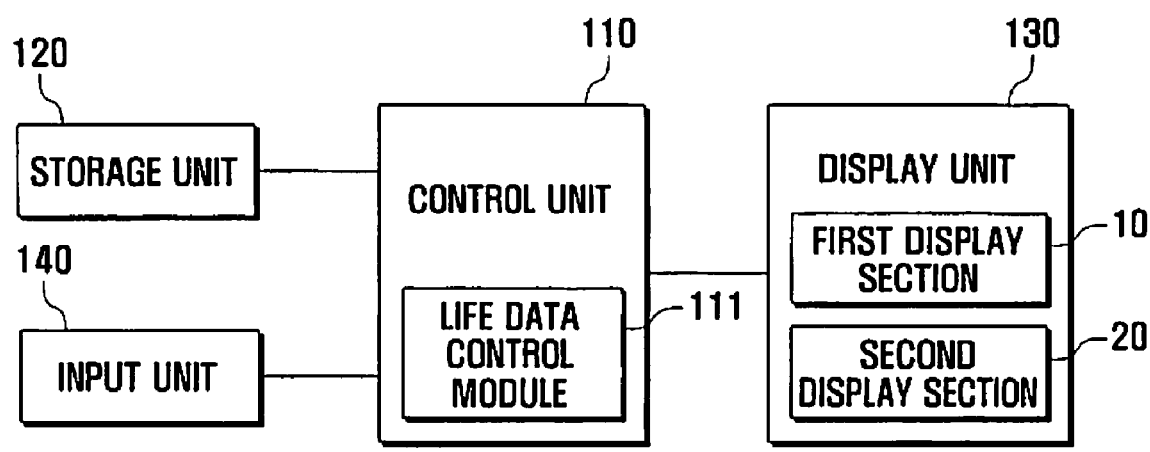
FIG. 6 is a block diagram showing a configuration of a data processing apparatus according to an embodiment of the present invention.

FIG. 6 is a block diagram showing a configuration of a data processing apparatus according to an embodiment of the present invention.

Referring to FIG. 6, the data processing apparatus 100 includes a control unit 110, a storage unit 120, a display unit 130, and an input unit 140.

The control unit 110 controls general operation of the data processing apparatus 100 and each component of the data processing apparatus 100 to execute a menu function. The control unit 110 controls the storage unit 120 to store data generated during the execution of a menu function. In particular, the control unit 110 includes a life data control module 111. In a life data mode, the life data control module 111 sorts the data stored in the data processing apparatus 100 by dates, and if a data sort function is input through the input unit 140, the life data control module 111 sorts the data according to the input data sort function. The control unit 110 controls the display unit 130 to display the data sorted by dates.

The storage unit 120 stores programs to be executed and data processed by the data processing apparatus 100. The storage unit 120 includes at least one volatile memory device and at least one non-volatile memory device. The storage unit 120 stores all data generated by the data processing apparatus 100 and data identification information according to the control of the control unit 110. The data identification information includes a data generation date, a data size, a data file format, and an icon of data to be displayed in the second display section 20.

The display unit 130 displays a state of the data processing apparatus 100 and information related to operation of the data processing apparatus 100. The display unit 130 further displays data stored in the data processing apparatus 100 according to the control of the control unit 110. The display unit 130 is generally formed with a Liquid Crystal Display (LCD) and includes the first display section 10 and the second display section 20. Data sort functions are displayed in the first display section 10 according to the control of the control unit 110. If a data sort function is selected from the first display section 10, data is displayed in the second display section 20 by date according to the control of the control unit 110.

The input unit 140 receives an alphanumeric data input, and outputs a signal related to settings of various functions and control of the data processing apparatus 100 to the control unit 110. Conventional input devices such as a keypad, touchpad, and touch screen may be used as the input unit 140.

The control unit 110 identifies whether a life data mode is selected through the input unit 140 of the data processing apparatus 100, and controls the display unit 130 to display data stored in the storage unit 120. The control unit 110 identifies whether a data sort function is selected from the first display section 10 of the display unit 130, and controls the display unit 130 to display data corresponding to the selected data sort function in the second display section 20.

Figure 7:
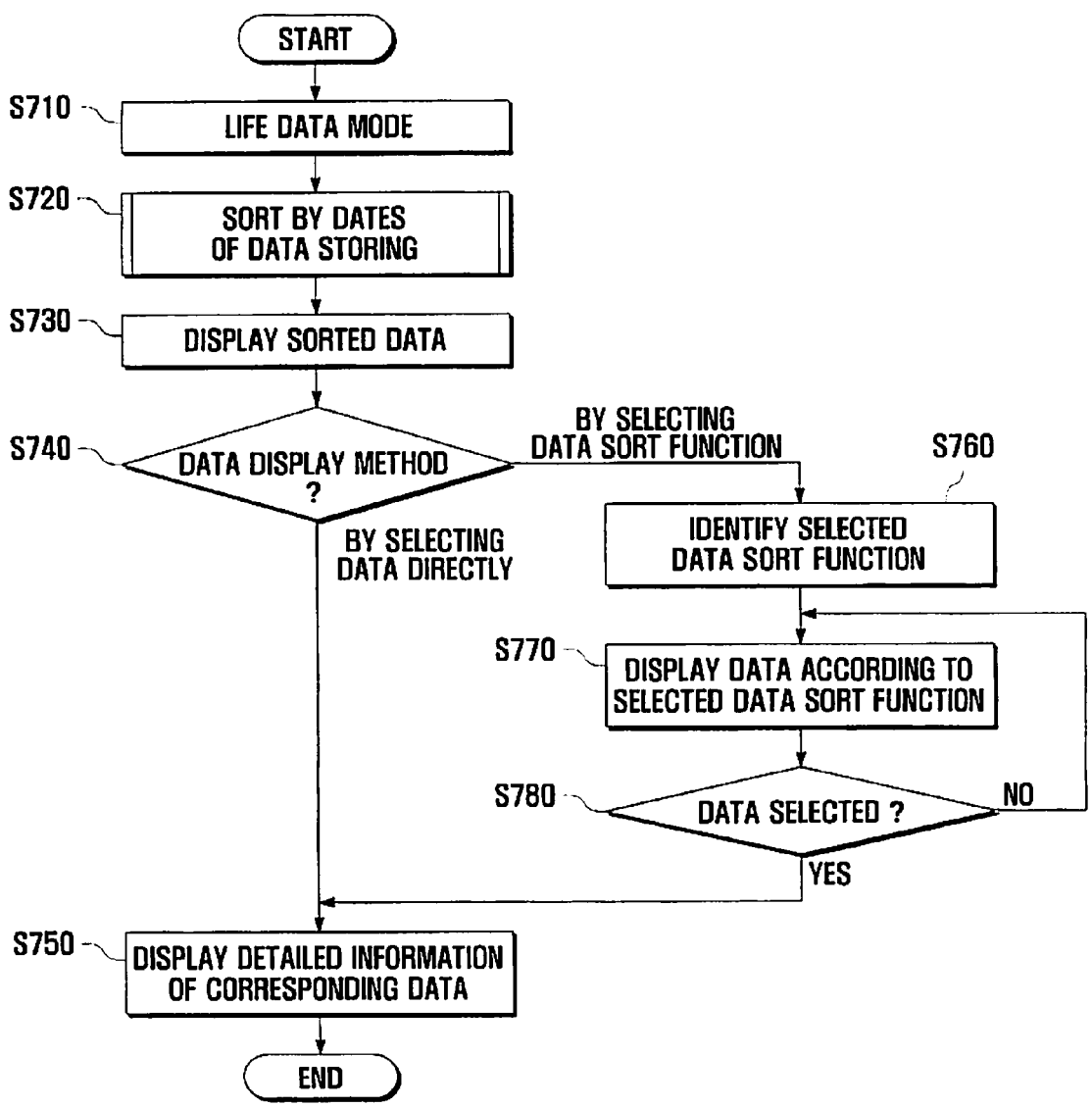
FIG. 7 is a flow chart showing a data display method according to an embodiment of the present invention.
Figure 8:
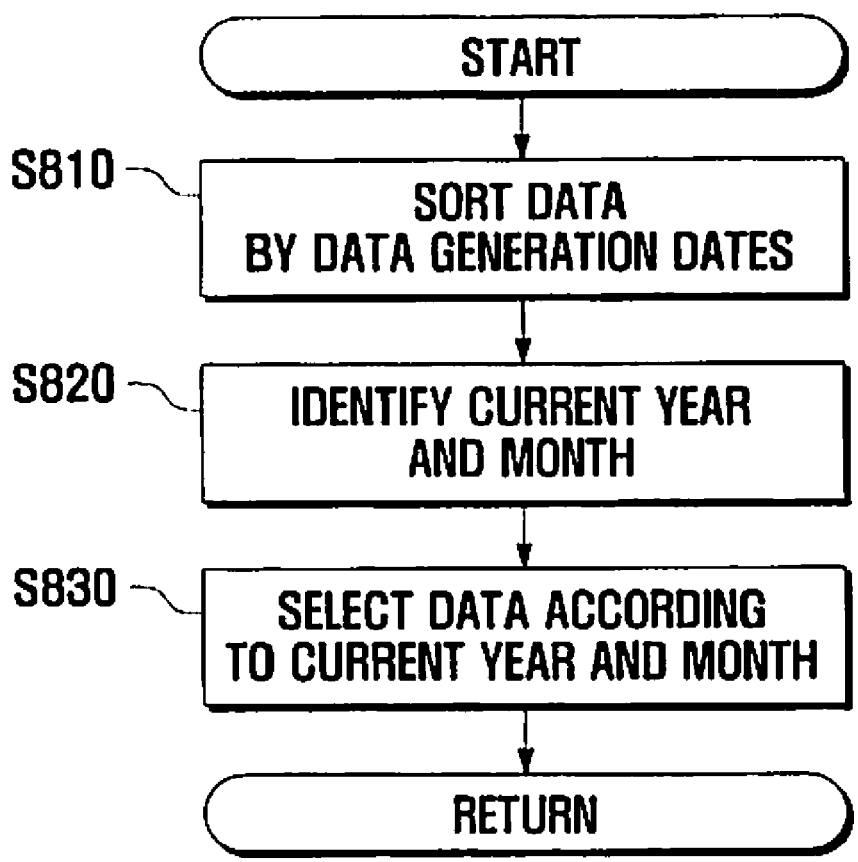
FIG. 8 is a flow chart showing a process of sorting data by dates in the data display method of FIG. 7.

FIG. 7 is a flow chart showing a data display method according to an embodiment of the present invention. FIG. 8 is a flow chart showing a process of sorting data by dates in the data display method of FIG. 7.

Referring to FIG. 7, if the control unit 110 detects that a life data mode is selected by a user in step S710, the control unit 110 sorts data stored in the data processing apparatus 100 by dates in step S720.

Step S720 of sorting data by date is described in more detail in FIG. 8. The control unit 110 identifies data stored in the storage unit 120 and sorts the identified data by dates in step S810. The control unit 110 identifies the current year and month set by the data processing apparatus 100 in step S820 and selects data corresponding to the identified current year and month in step S830.

After sorting data by dates at step S720, the control unit 110 displays the selected data as icons in the second display section 20 of the display unit 130 in order of data generation dates in step S730. In the method of displaying data in the second display section 20, a plurality of second date display areas 21 are displayed, and if a second date display area 21 is selected from the displayed second date display areas 21, data corresponding to the selected second date display area 21 may be displayed in a data display area 23, or both second date display area 21 and data display area 23 corresponding to the selected second date display area 21 may be displayed.

The control unit 110 then identifies a data display method input through the input unit 140 in step S740. Data may be displayed by directly selecting an icon from the data display area 23 or by selecting a sort function from the first display section 10.

If an icon is directly selected from data icons displayed in the data display area 23, the control unit 110 displays detailed information in the display unit 130 corresponding to the selected icon in step S750. The detailed information may include a data file name, a data generation time point, and a description added to the data. The detailed information may further include an actual data size corresponding to an icon displayed in the data display area 23.

If a sort function is selected from the first display section 10 at step S740, the control unit 110 identifies the selected sort function and sorts the data according to the selected sort function in step S760, and displays the sorted data as icons in the data display area 23 in step S770. For example, if the user inputs a keyword in the input window 15a of the search area 15 and inputs the search key 15b, the control unit 110 searches data corresponding to the input keyword and displays found data as icons in the second display section 20 of the display unit 130. If more than one sort function is selected in the first display section 10, data satisfying all conditions of the selected sort functions may be displayed.

The control unit 110 identifies whether an icon is selected from the displayed icons in step S780. If an icon is selected from the displayed icons, the process continues at step S750 and the control unit 110 displays detailed information according to the icon selected at step S780.

According to the present invention, data may be displayed in order of data generation dates in a data processing apparatus, data stored in the processing apparatus may be identified easily, and the data may further be sorted and displayed according to a desired filtering function. Therefore, a user may identify data quickly and find desired data easily.

While the invention has been shown and described with reference certain preferred embodiments thereof, it will be understood by those skilled in the art that various changes in form and details may be made therein without departing from the spirit and scope of the invention as defined by the appended claims.

What is claimed is:

1. A data processing apparatus comprising:
a storage unit for storing data processed by the data processing apparatus and identification information for sorting the data;
a display unit having a first display section for displaying one or more data sort functions for sorting the data and a second display section for displaying data according to a data sort function selected from the first display section in a life data mode to sort the stored data by data generation dates and subsequently by a selected data sort function; and
a control unit for sorting the data stored in the storage unit and controlling the display unit to display the sorted data as icons in the second display section and displaying detailed information corresponding to an icon when the icon is selected from the displayed icons.

2. The data processing apparatus of claim 1, wherein the second display section comprises:
a date display area for displaying a data generation date; and
a data display area for displaying the data corresponding to the data generation date.

3. The data processing apparatus of claim 1, wherein the control unit displays the data in the data display area according to a selected data sort function, when the data sort function is selected from the first display section.

4. The data processing apparatus of claim 2, wherein the data is displayed as an icon.

5. The data processing apparatus of claim 1, wherein the identification information comprises at least one of a data generation date, data size, data file format, and an icon of data.

6. The data processing apparatus of claim 3, wherein the first display section comprises:
- a search area for searching data by inputting a keyword;
- a filtering area for sorting data by types of data; and
- a tag area for displaying tags assigned to individual data and sorting data by selecting a tag.

7. The data processing apparatus of claim 6, wherein the search area comprises:
- an input window for inputting a keyword for a data search;
- a search key for starting a search with the input keyword; and
- a cancel key for canceling the search and returning to a previous state of the input window.

8. The data processing apparatus of claim 6, wherein the filtering area comprises:
- a type filtering key for sorting the data by types of data;
- a time filtering key for sorting the data by data generation time point; and
- a format filtering key for sorting the data by data file formats.

9. The data processing apparatus of claim 6, wherein the tag area displays a list of tags assigned to individual data.

10. A method of displaying time-based data in a data processing apparatus, comprising the steps of
- sorting data stored in the data processing apparatus by date in a life data mode to sort the stored data by data generation dates and subsequently by a selected data sort function;
- displaying a first display section having one or more data sort functions for sorting the data and a second display section displaying the data sorted by date;
- displaying the data as icons according to a selected data sort function in the second display section, when the data sort function is selected from the first display section; and
- displaying detailed information corresponding to an icon when the icon is selected from the displayed icons.

11. The method of claim 10, wherein the data is displayed as an icon.

12. The method of claim 10, wherein sorting data by dates comprises:
- sorting the stored data by data generation dates;
- identifying the year and month of the data generation dates; and
- selecting data from the sorted data according to the year and month of the data generation dates.

13. The method of claim 10, wherein the first display section comprises a first date display area for displaying a year and a month in which the data is generated.

14. The method of claim 13, wherein the first display section further comprises a search area, a filtering area, and a tag area.

15. A data processing apparatus comprising:
- a storage unit for storing data generated by the data processing apparatus;
- a display unit having a first display section and a second display section, wherein the first display section has a first date display area, a search area, a filtering area, and a tag area for sorting the data, and wherein the second display section has a second date display area for displaying a data generation date and a data display area for displaying the data in a life data mode to sort the stored data by data generation dates and subsequently by a selected data sort function; and
- a control unit for sorting the data stored in the storage unit and controlling the display unit to display the data as icons in the second display section according to a data sort function selected from the first display section and displaying detailed information corresponding to an icon when the icon is selected from the displayed icons.

* * * * *